US009119212B2

(12) United States Patent
Budianu et al.

(10) Patent No.: US 9,119,212 B2
(45) Date of Patent: Aug. 25, 2015

(54) INTER-CELL INTERFERENCE CANCELLATION FRAMEWORK

(75) Inventors: Petru C. Budianu, San Diego, CA (US); Ravi Palanki, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 643 days.

(21) Appl. No.: 12/437,342

(22) Filed: May 7, 2009

(65) Prior Publication Data

US 2010/0009634 A1    Jan. 14, 2010

Related U.S. Application Data

(60) Provisional application No. 61/080,051, filed on Jul. 11, 2008.

(51) Int. Cl.
*H04B 1/00* (2006.01)
*H04W 72/08* (2009.01)
(Continued)

(52) U.S. Cl.
CPC .......... *H04W 72/082* (2013.01); *H04W 52/244* (2013.01); *H04W 72/0406* (2013.01)

(58) Field of Classification Search
USPC ....................................... 455/63.1, 501, 509
IPC ........................................................ H04B 1/00
See application file for complete search history.

(56) References Cited

U.S. PATENT DOCUMENTS 7,190,964 B2  3/2007  Damnjanovic et al.
7,218,894 B2  5/2007  Schmidl et al.
(Continued)

FOREIGN PATENT DOCUMENTS

CN    1424863 A    6/2003
CN    1741423 A    3/2006
(Continued)

OTHER PUBLICATIONS

"3GPP TR 25.814 V1.5.0; 3rd Generation Partnership Project; Technical Specification Group Radio Access Network; Physical Layer Aspects for Evolved UTRA (Release 7)" Internet Citation May 27, 2006, pp. 1-125, XP002574055, Citing generally to the entire document, and specifically to sections 7.1.2.6 and 7.1.2.6.2.

(Continued)

*Primary Examiner* — Patricia T Nguyen
(74) *Attorney, Agent, or Firm* — Dalei Dong

(57) ABSTRACT

Communication techniques enable efficient communication to an UE (User Equipment) that is subject to a dominant interference signal that is transmitted by a different base station. Disclosed interference cancellation techniques, both UE-centric and network-centric, are suitable to this situation. These techniques are particularly advantageous when undesirable or difficult to introduce changes in the physical (PHY) and medium access control (MAC) layers at the existing base stations. UE-centric framework refers to an approach largely implemented by UEs to include pico or femto cells. Network-centric framework closed-loop coordination between base stations and UEs mitigate interference thereby improving network performance. In particular, an interfering base-station can help a "victim" UE by adjusting downlink pilot and control power and to adjust traffic data rates responsive to information that the "victim" UEs provide, including information about the interfering link and performance of the cancellation itself sent over the air or using the backhaul.

44 Claims, 8 Drawing Sheets

(51) Int. Cl.
*H04W 52/24* (2009.01)
*H04W 72/04* (2009.01)

(56) References Cited

U.S. PATENT DOCUMENTS

| | | | |
|---|---|---|---|
| 7,248,841 B2 | 7/2007 | Agee et al. | |
| 7,254,158 B2 * | 8/2007 | Agrawal | 375/136 |
| 7,428,269 B2 | 9/2008 | Sampath et al. | |
| 7,477,622 B2 * | 1/2009 | Attar et al. | 370/329 |
| 7,548,760 B2 | 6/2009 | Vasudevan et al. | |
| 7,822,385 B2 | 10/2010 | Lopez | |
| 7,949,005 B2 | 5/2011 | Li et al. | |
| 8,023,955 B2 | 9/2011 | Anderson et al. | |
| 8,064,837 B2 | 11/2011 | Sampath | |
| 8,160,013 B2 * | 4/2012 | Kim et al. | 370/329 |
| 8,194,598 B2 | 6/2012 | Attar et al. | |
| 8,229,365 B2 | 7/2012 | Westerberg et al. | |
| 8,521,089 B2 | 8/2013 | Lin et al. | |
| 8,526,963 B2 * | 9/2013 | Ji et al. | 455/447 |
| 2002/0044614 A1 * | 4/2002 | Molnar et al. | 375/346 |
| 2004/0192208 A1 | 9/2004 | Kong et al. | |
| 2006/0203794 A1 | 9/2006 | Sampath et al. | |
| 2006/0203891 A1 | 9/2006 | Sampath et al. | |
| 2006/0293056 A1 | 12/2006 | Kim et al. | |
| 2007/0010957 A1 | 1/2007 | Sampath et al. | |
| 2007/0011550 A1 | 1/2007 | Agrawal et al. | |
| 2007/0040704 A1 * | 2/2007 | Smee et al. | 340/981 |
| 2007/0060057 A1 | 3/2007 | Matsuo et al. | |
| 2007/0060061 A1 | 3/2007 | Sampath | |
| 2007/0183451 A1 | 8/2007 | Lohr et al. | |
| 2007/0248052 A1 | 10/2007 | Nagaraj et al. | |
| 2007/0280175 A1 * | 12/2007 | Cheng et al. | 370/338 |
| 2008/0069074 A1 | 3/2008 | Shin et al. | |
| 2008/0170638 A1 | 7/2008 | Schmidl et al. | |
| 2009/0154620 A1 | 6/2009 | Mostafa | |
| 2009/0196162 A1 * | 8/2009 | Sambhwani et al. | 370/201 |
| 2009/0254790 A1 | 10/2009 | Pi et al. | |
| 2009/0264142 A1 * | 10/2009 | Sankar et al. | 455/501 |
| 2009/0286482 A1 | 11/2009 | Gorokhov et al. | |
| 2010/0008294 A1 | 1/2010 | Palanki et al. | |
| 2010/0009705 A1 | 1/2010 | Budianu et al. | |
| 2010/0011269 A1 | 1/2010 | Budianu et al. | |
| 2010/0069010 A1 * | 3/2010 | Karakayali et al. | 455/63.1 |
| 2010/0080323 A1 * | 4/2010 | Mueck et al. | 375/296 |
| 2010/0099449 A1 | 4/2010 | Borran et al. | |
| 2010/0190447 A1 | 7/2010 | Agrawal et al. | |
| 2010/0235704 A1 | 9/2010 | Gunnarsson et al. | |
| 2010/0265862 A1 * | 10/2010 | Choi et al. | 370/311 |
| 2011/0041027 A1 | 2/2011 | Fong et al. | |

FOREIGN PATENT DOCUMENTS

| | | |
|---|---|---|
| EP | 1318613 A2 | 6/2003 |
| JP | 2000152332 A | 5/2000 |
| JP | 2002209253 A | 7/2002 |
| JP | 2003174400 A | 6/2003 |
| JP | 2007049998 A | 3/2007 |
| WO | WO2004036768 | 4/2004 |
| WO | WO2007015466 A1 | 2/2007 |
| WO | WO2007024895 | 3/2007 |
| WO | 2007049998 A1 | 5/2007 |
| WO | WO2007108751 | 9/2007 |
| WO | WO2008036280 | 3/2008 |
| WO | WO2008058112 | 5/2008 |

OTHER PUBLICATIONS

Partial International Search Report—PCT/US2009/045195—International Search Authority, European Patent Office,Nov. 11, 2010.

Qualcomm Europe: "UTRAN enhancements for the support of inter-cell interference cancellation" 3GPP Draft; R3-080069 UTRAN Enhancements for the Support of Inter-Cell Interference Cancellation, 3rd Generation Partnership Project (3GPP), Mobile Competence Centre ; 650, Route Des Lucioles ; F-06921 Sophia-Antipolis Cedex ; France, vol. RAN WG1, No. Shenzhen, China; 20080319, Mar. 19, 2008, XP050110087.

Ritt et al: "TP on uplink inter-cell interference cancellation" 3GPP Draft; R1-060418, 3rd Generation Partnership Project (3GPP), Mobile Competence Centre ; 650, Route Des Lucioles ; F-06921 Sophia-Antipolis Cedex ; France, vol . RAN WG1, No. Denver, USA 20060209, Feb. 9, 2006, XP050101362 [retrieved on Feb. 9, 2006] the whole document.

3GPP TR 25.814 V1.2.0, 3rd Generation Partnership Project, Technical Specification.

Group Radio Access Network, Physical Layer Aspects for Evolved UTRA (Release 7), Internet Citation, Feb. 1, 2006, XP002400401, Retrieved from the Internet: URL: http://www.3gpp.org/ftp/Specs/html-info/25814.htm [retrieved on Sep. 26, 2006].

International Search Report and Written Opinion—PCT/US2009/045195, International Search Authority—European Patent Office—Mar. 24, 2011.

Vodafone Group et al., "MDC & Cell Interference control in eHSPA architecture", 3GPP Draft, R3-071611, 3RD Generation Partnership Project (3GPP), Mobile Competence Centre, 650, Route Des Lucioles, F-06921 Sophia- Antipolis Cedex, France, vol. RAN WG3, No. Athens, Greece, Aug. 17, 2007, XP050162420, [retrieved on Aug. 17, 2007].

3GPP TR 25.814 v1.4.0, (May 2006), "3rd Generation Partnership Project; Technical Specification Group Radio Access Network; Physical Layer Aspects for EVolved UTRA (Release 7)", pp. 1-121.

* cited by examiner

APPARATUS 802

- MEANS FOR ACCESSING A FIRST IDENTIFIER USED BY THE SERVING BASE STATION TO ENCODE A FIRST LINK 804
- MEANS FOR ACCESSING A SECOND IDENTIFIER USED BY THE INTERFERING BASE STATION TO ENCODE A SECOND LINK 806
- MEANS FOR RECEIVING A SIGNAL CONTAINING THE FIRST AND SECOND LINKS 808
- MEANS FOR CANCELING THE SECOND LINK BY ESTIMATING THE SECOND LINK WITH THE CORRESPONDING IDENTIFIER AND CANCELING THE SECOND LINK FROM THE RECEIVED SIGNAL 810
- MEANS FOR DECODING THE FIRST LINK FROM THE RECEIVED SIGNAL BY CHANNEL ESTIMATION 812

FIG. 8

APPARATUS 902

- MEANS FOR TRANSMITTING A FIRST LINK ENCODED WITH A FIRST IDENTIFIER TO A UE THAT ALSO RECEIVES AN INTERFERING SECOND LINK FROM AN INTERFERING BASE STATION ENCODED WITH A SECOND IDENTIFIER 904
- MEANS FOR TRANSMITTING SECOND IDENTIFIER TO UE AND FOR RECEIVING FEEDBACK FROM THE NODE INDICATIVE OF ABILITY TO CANCEL ONE OF THE FIRST AND SECOND LINKS FROM A RECEIVED SIGNAL AT THE UE 906
- MEANS FOR CAUSING AN ADJUSTMENT IN TRANSMISSION FOR A RELATIVE CHANGE IN SIGNAL TO INTERFERING NOISE RATIO (SINR) OF ONE OF THE FIRST AND SECOND LINKS RESPONSIVE TO THE FEEDBACK 908

FIG. 9

INTER-CELL INTERFERENCE CANCELLATION FRAMEWORK

CLAIM OF PRIORITY UNDER 35 U.S.C. §119

The present Application for Patent claims priority to Provisional Application No. 61/080,051 entitled "Systems and Methods for Uplink Inter-cell Interference Cancellation Using Hybrid Automatic Repeat (HARQ) Retransmissions," filed Jul. 11, 2008, assigned to the assignee hereof and hereby expressly incorporated by reference herein in their entirety.

CROSS REFERENCE TO RELATED APPLICATIONS

The present Application is related to co-pending and commonly assigned U.S. patent application Ser. No. 12/437,334 entitled "Inter-Cell Interference Cancellation Framework" filed on even date herewith, which in turn claims priority to Provisional Application No. 61/080,051, entitled "Systems and Methods for Uplink Inter-cell Interference Cancellation Using Hybrid Automatic Repeat Request (HARQ) Retransmissions," filed Jul. 11, 2008, the disclosures of both of which are hereby expressly incorporated by reference in their entirety.

The present application is related to co-pending and commonly assigned U.S. patent application Ser. No. 12/437,362 entitled "Downlink Interference Cancellation Techniques" filed on even date herewith, which in turn claims priority to Provisional Application No. 61/147,411 filed Jan. 26, 2009 and to Provisional Application No. 61/147,615 filed Jan. 27, 2009, both entitled "Downlink Interference Cancellation Techniques", the disclosures of which are hereby expressly incorporated by reference in their entirety.

The present application is related to co-pending and commonly assigned U.S. patent application Ser. No. 12/437,355 entitled "Systems and Methods for Uplink Inter-cell Interference Cancellation Using Hybrid Automatic Repeat Request (HARQ) Retransmissions" filed on even date herewith, which in turn claims priority to Provisional Application No. 61/080,051 of the same title filed Jul. 11, 2008, the disclosures of both of which are hereby expressly incorporated by reference in their entirety.

BACKGROUND

1. Field

The present disclosure relates generally to wireless communications, and more specifically but not exclusively to various electronic circuitry or algorithms for interference management in a wireless network.

2. Background

Wireless networks are widely deployed to provide various services to consumers, such as telephony, data, video, audio, messaging, broadcasts, etc. Wireless networks enable broadband communications over a regional, nationwide, or even global region. Such networks are sometimes referred as Wireless Wide Area Networks (WWANs). One common example of a WWAN is a cellular network that supports CDMA2000, a telecommunications standard that uses Code Division Multiple Access (CDMA) to send voice, data, and signaling between mobile subscribers. Another example of a WWAN is a cellular network that provides broadband Internet access to mobile subscribers, such as Evolution-Data Optimized (EV-DO) or Ultra Mobile Broadband (UMB), both of which are part of the CDMA2000 family of air interface standards. Other examples include WCDMA, HSPA, LTE (Long Term Evolution) and LTE-Advanced. These cellular networks generally provide coverage over multiple cellular regions, with a fixed-site base station located in each cell to serve mobile subscribers.

In one particular exemplary use in a network, a terminal may communicate with a serving base station on the forward and/or reverse link. On the forward link, the terminal may observe high interference from an interfering base station. On the reverse link, the serving base station may observe high interference from an interfering terminal. The interference on each link may degrade performance of data transmission sent on that link. In future revisions of wireless standards such as LTE, there is a need to support base stations of different powers (e.g., high-powered macrocells and lower-powered picocells). Additionally, there may be some cells (henceforth referred to as femtocells) that operate under "restricted association," or Closed Subscriber Group (CSG) i.e., they only allow some user terminals (UEs) to connect to them. For example, these UEs may belong to users who subscribe to a special access plan offered by the operator.

In a traditional homogeneous deployment, an UE typically connects to the cell with the highest geometry (i.e., signal to noise ratio). However, in some cases such as disjoint links, it could connect to a weaker cell as the strongest forward link geometry cell may not be the same as the strongest reverse link cell (or vice versa). Moreover, in a heterogeneous deployment, there are benefits in allowing the UE to connect to a weaker base station. For example, an UE may connect to the cell with the lowest path loss to minimize interference caused to the network, even though its geometry is lower. Similarly, in the case of restricted association, an UE may be forced to connect to a weaker geometry base station as it may not have permission to access the strongest geometry base station.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with canceling an interfering channel by use of an identifier that was used to encode the interfering channel. A network entity (e.g., serving base station and/or interfering base station) makes transmission adjustments that affect a signal to interfering noise ratio (SINR) of one of the channels to enhance cancellation of interference.

In one aspect, a method is provided for network facilitating wireless inter-cell interference cancellation at a served user equipment (UE) by transmitting a first link encoded with a first identifier to a served UE that also receives an interfering second link from an interfering base station encoded with a second identifier; transmitting the second identifier to the UE; receiving feedback from the served UE indicative of the ability to cancel one of the first and second links from a received signal at the served UE; and causing an adjustment in transmission for a relative change in signal to the interfering noise ratio (SINR) of one of the first and second links responsive to the feedback, wherein the served UE performs cancellation of the second link when received at a higher SINR by decoding the second link with the second identifier, re-encoding the second link with the second identifier, canceling the second link from the received signal, and decoding the first link from the received signal by channel estimation.

In another aspect, at least one processor is provided for network facilitating wireless inter-cell interference cancellation at a served UE. A first module transmits a first link encoded with a first identifier to a served UE that also receives an interfering second link from an interfering base station encoded with a second identifier. A second module transmits the second identifier to the UE and receives feedback from the served UE indicative of the ability to cancel one of the first and second links from a received signal at the served UE. A third module causes an adjustment in transmission for a relative change in signal to interfering noise ratio (SINR) of one of the first and second links responsive to the feedback. The served UE performs cancellation of the second link when received at a higher SINR by decoding the second link with the second identifier, re-encoding the second link with the second identifier, canceling the second link from the received signal, and decoding the first link from the received signal by channel estimation.

In an additional aspect, a computer program product is provided for network facilitating wireless inter-cell interference cancellation at a served UE. A computer-readable storage medium comprises a first set of codes for causing a computer to transmit a first link encoded with a first identifier to a served UE that also receives an interfering second link from an interfering base station encoded with a second identifier. A second set of codes causes the computer to transmit the second identifier to the UE and to receive feedback from the served UE indicative of ability to cancel one of the first and second links from a received signal at the served UE. A third set of codes causes the computer to cause an adjustment in transmission for a relative change in signal to interfering noise ratio (SINR) of one of the first and second links responsive to the feedback. The served UE performs cancellation of the second link when received at a higher SINR by decoding the second link with the second identifier, re-encoding the second link with the second identifier, canceling the second link from the received signal, and decoding the first link from the received signal by channel estimation.

In another additional aspect, an apparatus is provided for network facilitating wireless inter-cell interference cancellation at a served UE. Means are provided for transmitting a first link encoded with a first identifier to a served UE that also receives an interfering second link from an interfering base station encoded with a second identifier. Means are provided for transmitting the second identifier to the UE and for receiving feedback from the served UE indicative of ability to cancel one of the first and second links from a received signal at the served UE. Means are provided for causing an adjustment in transmission for a relative change in signal to interfering noise ratio (SINR) of one of the first and second links responsive to the feedback. The served UE performs cancellation of the second link when received at a higher SINR by decoding the second link with the second identifier, re-encoding the second link with the second identifier, canceling the second link from the received signal, and decoding the first link from the received signal by channel estimation.

In a further aspect, an apparatus is provided for network facilitating wireless inter-cell interference cancellation at a served UE. A transmitter transmits a first link encoded with a first identifier to a served UE that also receives an interfering second link from an interfering base station encoded with a second identifier. The transmitter also transmits the second identifier to the served UE. A receiver at either the transmitter of the first link or the interfering base station receives feedback from the served UE indicative of ability to cancel one of the first and second links from a received signal at the served UE. A computing platform causes an adjustment in transmission for a relative change in signal to interfering noise ratio (SINR) of one of the first and second links responsive to the feedback. The served UE performs cancellation of the second link when received at a higher SINR by decoding the second link with the second identifier, re-encoding the second link with the second identifier, canceling the second link from the received signal, and decoding the first link from the received signal by channel estimation.

In yet one aspect, a method is provided for facilitating wireless inter-cell interference cancellation by a non-served UE. While a serving base station transmits a first link encoded with a first identifier to a non-served UE, an interfering second link encoded with a second identifier is transmitted. Communication is received from the serving base station indicating that the interfering second link requires interference cancellation by the non-served UE. Transmission is adjusted of the interfering second link to facilitate interference cancellation by the non-served UE.

In yet another aspect, a computer program product is provided for facilitating wireless inter-cell interference cancellation by a non-served UE. A computer-readable storage medium comprises a set of codes for causing a computer, while a serving base station transmits a first link encoded with a first identifier to a non-served UE, to transmit an interfering second link encoded with a second identifier. A set of codes causes the computer to receive communication from the serving base station indicating that the interfering second link requires interference cancellation by the non-served UE. A set of codes causes the computer to transmit the second identifier directly or indirectly to the non-served UE. A set of codes causes the computer to adjust transmission of the interfering second link to facilitate interference cancellation by the non-served UE.

In yet an additional aspect, an apparatus is provided for facilitating wireless inter-cell interference cancellation by a non-served UE. Means are provided for, while a serving base station transmits a first link encoded with a first identifier to a non-served UE, transmitting an interfering second link encoded with a second identifier. Means are provided for receiving communication from the serving base station indicating that the interfering second link requires interference cancellation by the non-served UE. Means are provided for transmitting the second identifier directly or indirectly to the non-served UE. Means are provided for adjusting transmission of the interfering second link to facilitate interference cancellation by the non-served UE.

In yet a further aspect, an apparatus is provided for facilitating wireless inter-cell interference cancellation by a non-served UE. A transmitter, while a serving base station transmits a first link encoded with a first identifier to a non-served UE, transmits an interfering second link encoded with a second identifier. A receiver receives communication from the serving base station indicating that the interfering second link requires interference cancellation by the non-served UE. The transmitter is further for transmitting the second identifier directly or indirectly to the non-served UE. A computing platform adjusts transmission of the interfering second link to facilitate interference cancellation by the non-served UE.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 8 depicts a block diagram of an apparatus having means for wireless inter-cell interference cancellation.

FIG. 9 depicts a block diagram of an apparatus having means for network facilitation of inter-cell interference cancellation.

DETAILED DESCRIPTION

Communication techniques enable efficient communication to an UE (User Equipment) that is subject to a dominant interference signal that is transmitted by a different base station. It is helpful to assume a synchronous system, meaning that the femtocells and picocells have access to a synchronizing source such as the Global Positioning System (GPS). Disclosed interference cancellation techniques, both UE-centric and network-centric, are suitable to this situation. These techniques are particularly advantageous when it is undesirable or difficult to introduce changes in the physical (PHY) and medium access control (MAC) layers at the existing base stations. UE-centric ("backward-compatible") framework refers to an approach largely implemented by UEs to include pico or femto cells. Network-centric framework closed-loop coordination between base stations and UEs achieves interference mitigation thereby improving network performance. In particular, an interfering base-station can help a "victim" UE by adjusting downlink pilot and control power and adjusting traffic data rates responsive to information that the "victim" UEs provide, including information about the interfering link and the performance of the cancellation itself (e.g., pre-cancellation CQI (channel quality indication) and ACK (acknowledgement)). This feedback information can be sent over the air or using the backhaul.

The word "exemplary" is used herein to mean "serving as an example, instance, or illustration." Any embodiment described herein as "exemplary" is not necessarily to be construed as preferred or advantageous over other embodiments. The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Packet Access (HSPA, HSPA+), Time Division Multiple Access (TDMA) systems, Frequency Division Multiple Access (FDMA) systems, Orthogonal Frequency Division Multiple Access (OFDMA) systems, or other multiple access techniques. A wireless communication system may be designed to implement one or more standards, such as IS-95, cdma2000, IS-856, W-CDMA, TD-SCDMA, and other standards.

The detailed description set forth below in connection with the appended drawings is intended as a description of various configurations of the invention and is not intended to represent the only configurations in which the invention may be practiced. The detailed description includes specific details for the purpose of providing a thorough understanding of the invention. However, it will be apparent to those skilled in the art that the invention may be practiced without these specific details. In some instances, well-known structures and components are shown in block diagram form in order to avoid obscuring the concepts of the invention.

Figure 1:
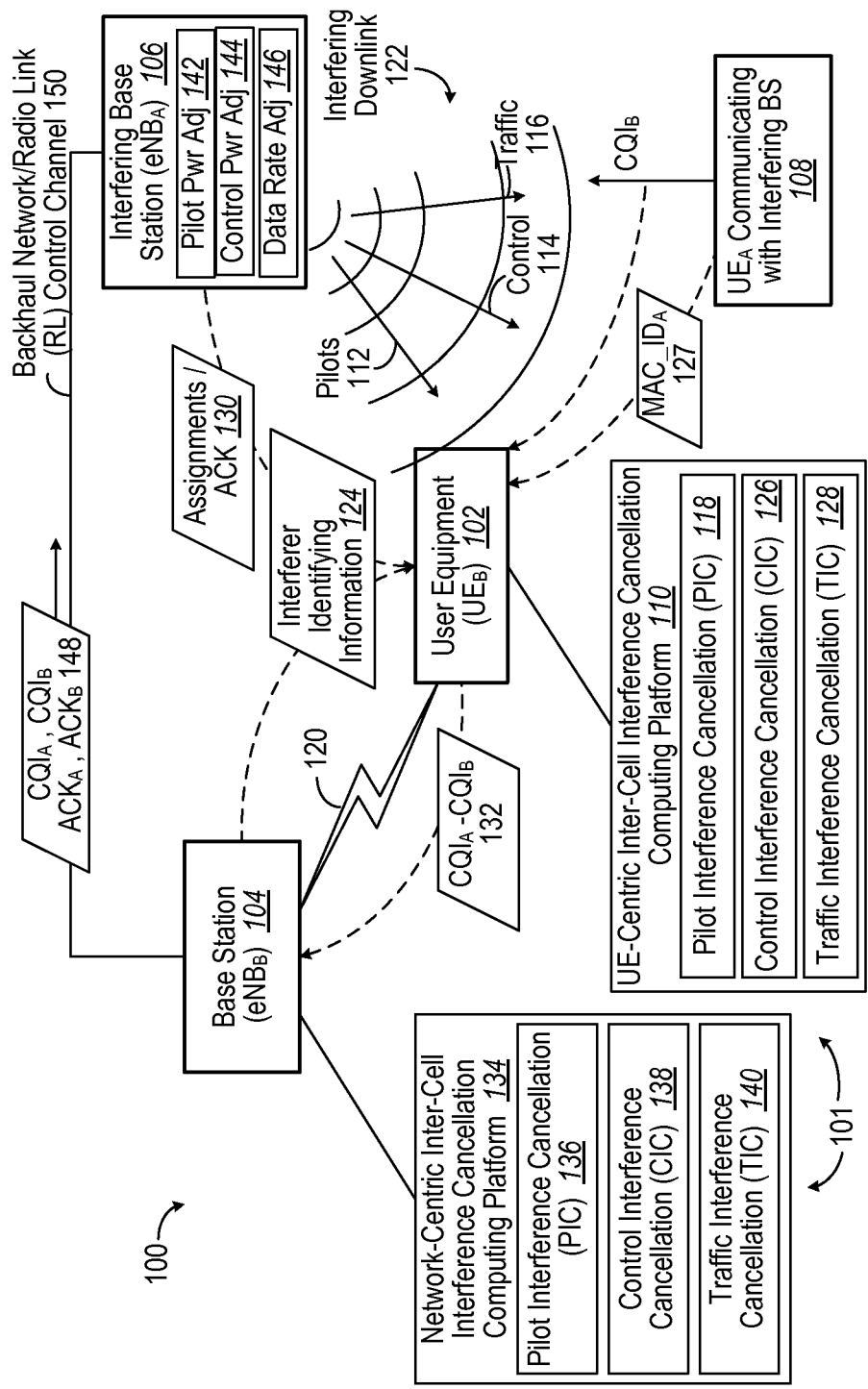
FIG. 1 depicts a block diagram of a wireless communication system with user equipment (UE) communicating with a base station in the presence of an interfering base station.

Referring now to the drawings, in FIG. 1, a wireless communication system 100 facilitates an inter-cell interference cancellation framework 101 performed by an interference mitigating UE ($UE_B$) 102 in order to effectively communicate with an interference mitigating evolved base station ($eNB_B$) 104 in the presence of a stronger interfering $eNB_A$ 106 that communicates with a second $UE_A$ 108.

In one aspect of the present innovation, interference cancellation by a computing platform 110 at the $UE_B$ 102 is used to allow the decoding of a signal that is subject to strong interference. In one aspect, the interference cancellation can be applied to a pilot channel ("pilots") 112, control channel 114 and traffic channel 116. Because the interference is created by a different base station $eNB_A$ 106, some extra information can be used in this cancellation process. For example, estimating of the interference can be done by decoding the interference and its identifier and re-encoding the interference with the corresponding identifier. It may also done by estimating the transmitted modulation symbols via soft estimation, iterative estimation or some other techniques.

In one aspect, Pilot Interference Cancellation (PIC) component 118 of the computing platform 110 of the $UE_B$ 102 cancels the pilots 112 from the stronger $eNB_A$ 106 from a received signal (i.e., combined downlink 120 from $eNB_B$ 104 and downlink 122 from $eNB_A$ 106) and then attempts to retrieve the downlink 120 transmitted by the weaker $eNB_B$ 104. PIC component 118 may be advantageous even if traffic interference cancellation is not used. In some interference avoidance schemes, $eNB_A$ 106 yields downlink resources for $eNB_B$ 104. Even in this case, the $eNB_A$ 106 might transmit RS (i.e., reference signals, an alternate name for pilots) for legacy reasons. If the RS of $eNB_A$ 106 and the RS of $eNB_B$ 104 overlap, then PIC is necessary or advantageous to enable a better estimation of the channel of $eNB_B$ 104. If the RS of $eNB_A$ 106 overlap with the traffic channel of $eNB_B$ 104, then the $UE_B$ 102 can either zero out the LLRs or try to cancel the pilots of $eNB_A$ 106 from its signal. The interference cancellation on the pilots 112 requires the $UE_B$ 102 to know the identifier (ID) of each cell 104, 106 as depicted at 124.

In another aspect, a Control Interference Cancellation (CIC) component 126 of the computing platform 110 of the $UE_B$ 102 performs interference cancellation on the control channels 114 which requires the $UE_B$ 102 to know MAC_IDs 127 of users (e.g., $UE_A$ 108) to which the interfering control channel is transmitted.

In an additional aspect, a Traffic interference Cancellation (TIC) component 128 of the computing platform 110 of the $UE_B$ 102 performs interference cancellation on the traffic channels 116 without extra actions from the interfering base station $eNB_A$ 106. The traffic interference cancellation requires the $UE_B$ 102 to know control information (i.e., assignments and ACKs) 130 that is relevant to the interfering traffic 116. Communication from the base station $eNB_B$ 104 to $UE_B$ 102 that performs interference cancellation is more efficient if some extra information about the interfering link (downlink 122) and the performance of the cancellation itself is provided to the base station $eNB_B$ 104 as pre-cancellation feedback 132 (CQI and ACK).

Alternatively or in addition, network entities such as the $eNB_B$ 104 and/or the $eNB_A$ 106 can be part of the part of inter-cell interference cancellation framework 101, enhancing the ability of the $UE_B$ 102. In one aspect, a computing platform 134 of the $eNB_B$ 104 can comprise a PIC component 136, a CIC component 138, and a TIC component 140 that can operate as described below. Further, the interfering $eNB_A$ 106 can cooperate with interference mitigation by use of a pilot power adjustment component 142, a control channel power adjustment component 144, and a traffic data rate adjustment component 146. This cooperation is responsive to relevant information (e.g., $CQI_A$, $CQI_B$, $ACK_A$, $ACK_B$) 148 sent over a backhaul network or radio link (RL) control channel 150.

Figure 2:
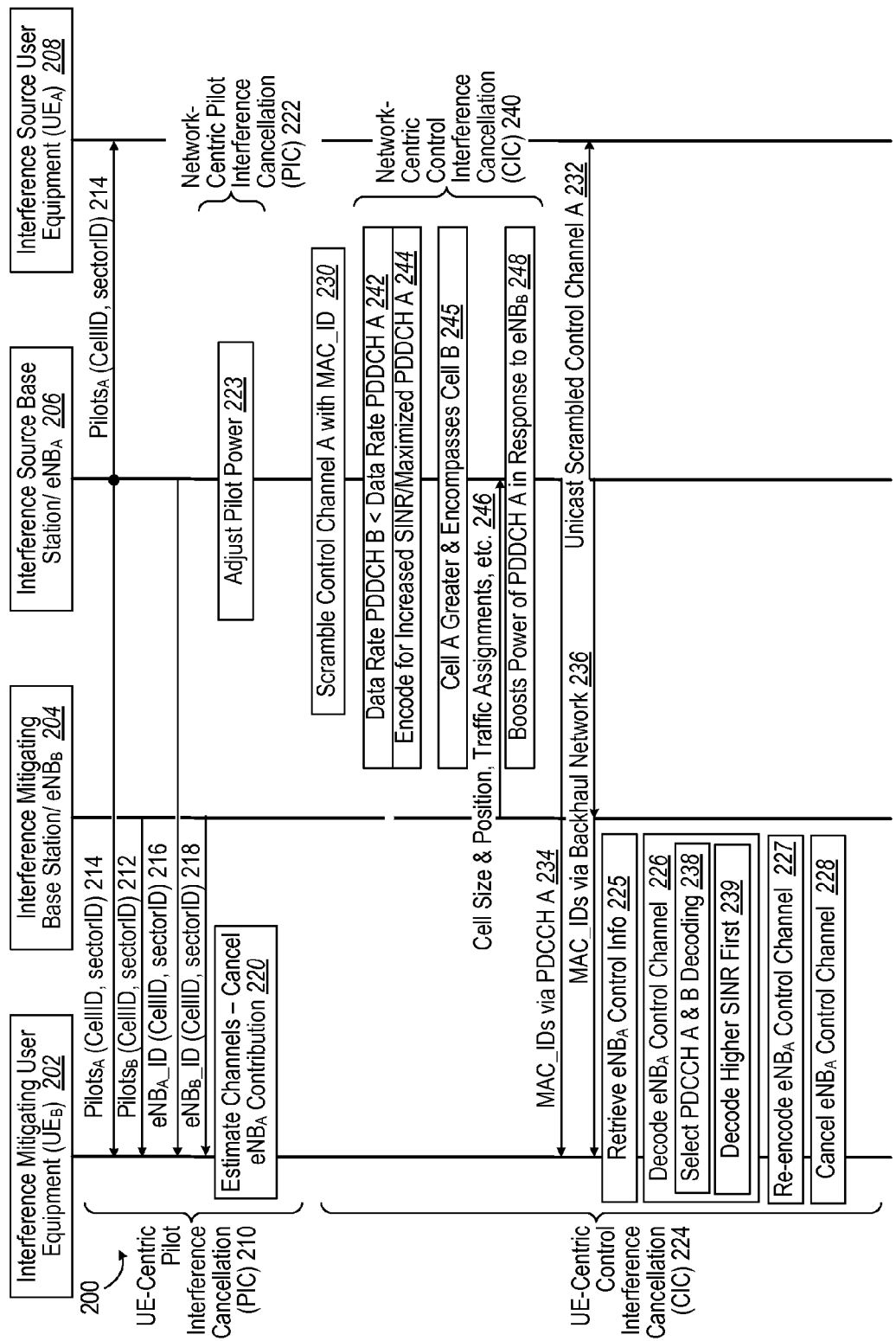
FIGS. 2-3 depict a timing diagram of a methodology or sequence of operations for performing pilot, control and traffic integration cancellation.

In FIG. 2, a methodology or sequence of operations 200 are provided for UE-centric inter-cell interference cancellation performed by an interference mitigating UE ($UE_B$) 202 in order to effectively communicate with an interference mitigating evolved base station ($eNB_B$) 204 in the presence of a stronger interfering $eNB_A$ 206 that communicates with a second $UE_A$ 208.

In one aspect, Pilot Interference Cancellation (PIC) is performed by a communication 200 as depicted at 210 wherein the pilots sent by the two eNBs 204, 206 overlap as depicted respectively at 212, 214. The pilots sent by each eNB 204, 206 are cell-specific and they are determined by an eNB_ID (e.g., cellID, sectorID). For PIC 210, $UE_B$ 202 retrieves the eNB_IDs of both eNBs, depicted respectively at 216, 218. $UE_B$ 202 uses the received pilots to estimate the channel of the stronger eNB and cancels the contribution of this eNB from the received pilot sequence (block 220). Then in block 222, $UE_B$ 202 uses the second eNB_ID to estimate the channel for the second $eNB_A$ 206.

Alternatively or in addition as depicted at 222, a network-centric Pilot Interference Cancellation (PIC) enhances efforts by the $UE_B$ 202 to cancel the pilots from the stronger $eNB_A$ 208 from the received signal and then attempts to retrieve the signal transmitted by the weaker $eNB_B$ 204. In particular, the network-centric PIC scheme 222 enables $eNB_A$ 206 to control the power of the pilots such that the UE-centric PIC 210 in the $UE_B$ 202 (e.g., femto-cells) is more efficient (block 223). In general, this can be particularly suitable to scenarios where dedicated pilots are used and thus an eventual power boost has a limited effect on the whole system.

In another aspect, Control Interference Cancellation (CIC) is performed as depicted at 224. In block 225, the retrieval of the control information sent by the interfering $eNB_A$ 206 is necessary. $UE_B$ 202 decodes the control channel of one $eNB_A$ 206 (block 226), re-encodes it (block 227), and cancels it out of the received signal (block 228).

In an illustrative implementation for LTE, the control channel$_A$ is scrambled with the MAC_ID of the intended user $UE_A$ 208 as depicted at block 230 and sent unicast from the $eNB_A$ 206 (block 232). In the case of LTE, the MAC_ID may be referred to as Cell Radio Network Temporary Identifier (c-RNTI). Thus, it is advantageous for the UE to know the MAC_IDs that are used to scramble the control channel that: (a) occupies the same PHY resources as the control channel from $eNB_B$ 204 to $UE_B$ 202; (b) carries assignments for the traffic channel (traffic from $eNB_A$ 206) that interferes with the traffic from $eNB_B$ 204. It should be appreciated that the cases (a) and (b) are not necessary mutually exclusive. The MAC_IDs that are used to scramble the control$_A$ can be revealed to the $UE_B$ 202: (i) over the air, using $PDCCH_A$ (physical downlink control channel), as depicted at 234, possibly using a special coding scheme; or (b) over the backhaul as depicted at 236.

Upon knowledge of the MAC_IDs, the UE can choose the PDCCH decoding method that allows the decoding of both PDCCHB and PDCCHA (as needed) (block 238). If CIC 224 is performed, the $UE_B$ 202 decodes first the PDCCH that is received at higher SINR (Signal to Interference-plus-Noise Ratio) (block 239).

In another additional aspect depicted at 240, network-centric Control Interference Cancellation (CIC) procedure enhances the ability of $UE_B$ 202 to decode the control channel (PDCCH) of one $eNB_A$ 206, re-encodes it and cancels it out of the received signal. In particular, the CIC can be performed more efficiently if the transmission of $PDCCH_B$ is adapted to this situation. Assume that the transmission rate on $PDCCH_B$ is much lower than the one on $PDCCH_A$ (block 242). In this situation, $eNB_B$ 204 might choose an encoding scheme for $PDCCH_B$ that maximizes the SINR at which the $PDCCH_A$ is received, thus enabling better decoding of this channel and better CIC (block 244).

Alternatively or in addition, the CIC can be performed more efficiently if the transmissions of $PDCCH_A$ are adapted to this situation. Assume that cell A is larger and cell B is inside cell A (block 245). In this situation $eNB_A$ 206 might want to boost the power of $PDCCH_A$ such that this channel can be decoded correctly by the UEs close to $eNB_B$ 204. Also, $eNB_A$ 206 might want to do this selectively; in this case, $eNB_B$ 204 can convey some relevant information (cell size and position, the traffic assignments of its users) to $eNB_A$ 206 on the backhaul (block 246) that $eNB_A$ 206 uses to boost the power of the $PDCCH_A$ (block 248). As an alternative or in addition to CIC, control orthogonalization may be used. In such a case, the control channels of the serving and interfering cells use different resources.

Figure 3:
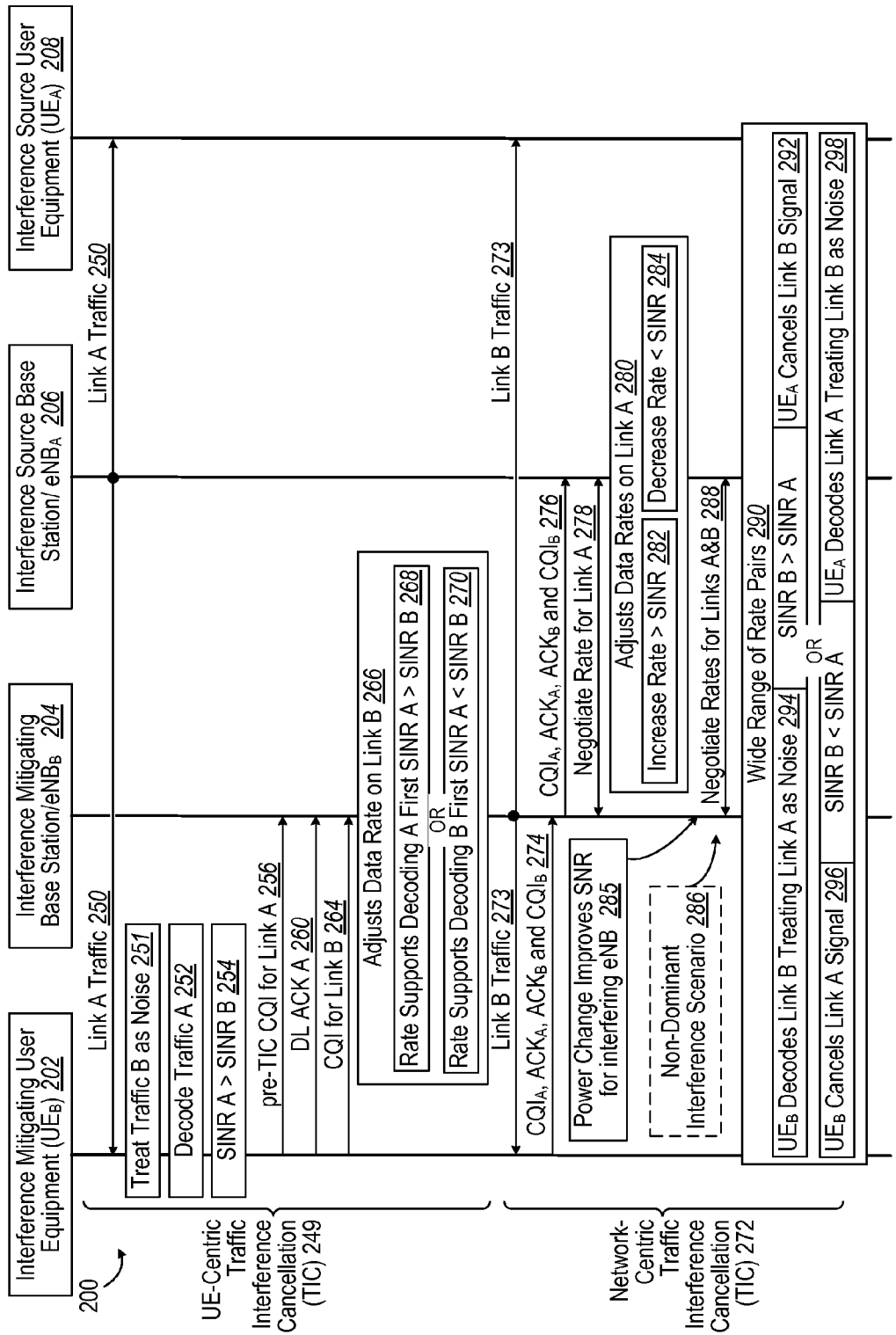

Continuing in FIG. 3, in an additional aspect, UE-centric ("backward-compatible") Traffic Interference Cancellation (TIC) is depicted at 249 wherein the traffic sent by $eNB_A$ 206 (the interfering traffic) as depicted at 250 can be decoded by the $UE_B$ 202 without any action (power control, rate adjustment) from $eNB_A$ 206 or $eNB_B$ 204. In this instance traffic power A is greater than traffic power B. The decoding of the traffic from $eNB_A$ 206 as depicted at is done by treating the traffic from $eNB_B$ 204 as noise (block 251). This might be possible, if, for example, the traffic sent by $eNB_A$ 206 is intended for a user that is at the cell edge, and thus is received by the $UE_B$ 202 of interest at high power. The $UE_B$ 202 decodes the control information relevant to the traffic sent by $eNB_A$ 206 (block 252).

The post-cancellation of SINR (Signal to Interference Noise Ratio) of the traffic from $eNB_B$ 204 can be substantially higher than the SINR that considers the traffic from $eNB_A$ 206 as interference as depicted 254. In this situation, it is useful for the $UE_B$ 202 to report to $eNB_B$ 204: (1) the (pre-TIC) CQI (channel quality indication) for link A, denoted as $CQI_A$ at 256; (1a) the ACK for the traffic on link A, denoted as DL $ACK_A$ at 260; and (2) the (post TIC) CQI for link B, denoted as $CQI_B$ as depicted at 264. The $UE_B$ 202 uses the $CQI_A$ and $ACK_A$ to adjust the rate on the link B (block 266). This adjustment can be done in two illustrative ways: (1) assure that the $UE_B$ 202 can perform UE-centric TIC (block 268) or (2) adjust the transmission on the traffic of link B such that the $UE_B$ 202 decodes it without doing UE-centric TIC first (block 270).

In an additional aspect depicted at 272, network-centric Traffic Interference Cancellation (TIC) can provide the additional SINR required for the $UE_B$ 202 in some instances to decode the interfering traffic (the traffic from $eNB_A$ 206) without extra help from $eNB_A$ 204. In the UE-centric TIC procedure 272, the extra actions required to enable correct decoding of the traffic channel on link B 273 were performed (mainly) by the $UE_B$ 202 and $eNB_B$ 204. In an illustrative implementation, the $UE_B$ 202 sends $CQI_A, ACK_A, ACK_B$ and $CQI_B$ to $eNB_B$ 204 as depicted at 274. The $UE_B$ 202 sends the same information ($CQI_A$, $CQI_B$, $ACK_A$, $ACK_B$) to $eNB_A$ 206 (e.g. over the backhaul or using the radio link (RL) control channel) (block 276). In one aspect, $eNB_B$ 204 and $eNB_A$ 206 negotiate the rates using the backhaul/RL control channel (block 278). The $eNB_A$ 206 adjusts the rate of the data that is transmitted on the link A 256 such that the $UE_B$ 202 can perform interference cancellation (block 280). The rate adjustment can be done in different ways. For example, if cell B is inside cell A, then $eNB_A$ 206 might schedule on link A users that (i) are at cell edge (have lower geometries) thus their signal is received at higher power inside the cell, which creates the situation of UE-centric TIC (block 282); (ii) have low data rate (e.g., VoIP users) (block 284). UE-centric TIC can be performed then as described above 249. As depicted at 285, the serving eNB changes its power to improve the SNR for the interfering eNB. This in turn enables the UE to estimate the interfering link better, which it can then cancel. It then gets better SINR from the serving cell.

In information theory, a scenario in which a pair of users communicates with a pair of base stations is referred to as the interference channel. In the previous scenarios, the presence of the $UE_A$ 208 that is supposed to receive the traffic on link A is not considered explicitly when the traffic on link B does not really affect the reception at $UE_A$ 208. However, in some instances there is a non-dominant interferer situation in which link B is also causing interference for $UE_A$ (block 286). In this situation, the rate adjustment (in fact, rate reduction) on the interfering link that is mentioned before comes at the expense of $UE_A$ 208. The $eNB_A$ 206 and $eNB_B$ 204 might negotiate a rate pair ($R_A, R_B$) that is suitable for both links A and B (block 288). One illustrative method to achieve a wide range of rate pairs is by resource sharing between two different interference cancellation schemes (block 290). In one exemplary scheme, $UE_A$ 208 cancels the signal received on link B (i.e., the signal intended for $UE_B$ 202) (block 292) while $UE_B$ 202 is decoding its signal treating the signal of link A as noise (block 294). In the other exemplary scheme, $UE_B$ 202 is doing the interference cancellation (block 296) while $UE_A$ 208 treats the signal from $eNB_B$ 204 as noise (block 298).

Figure 4:
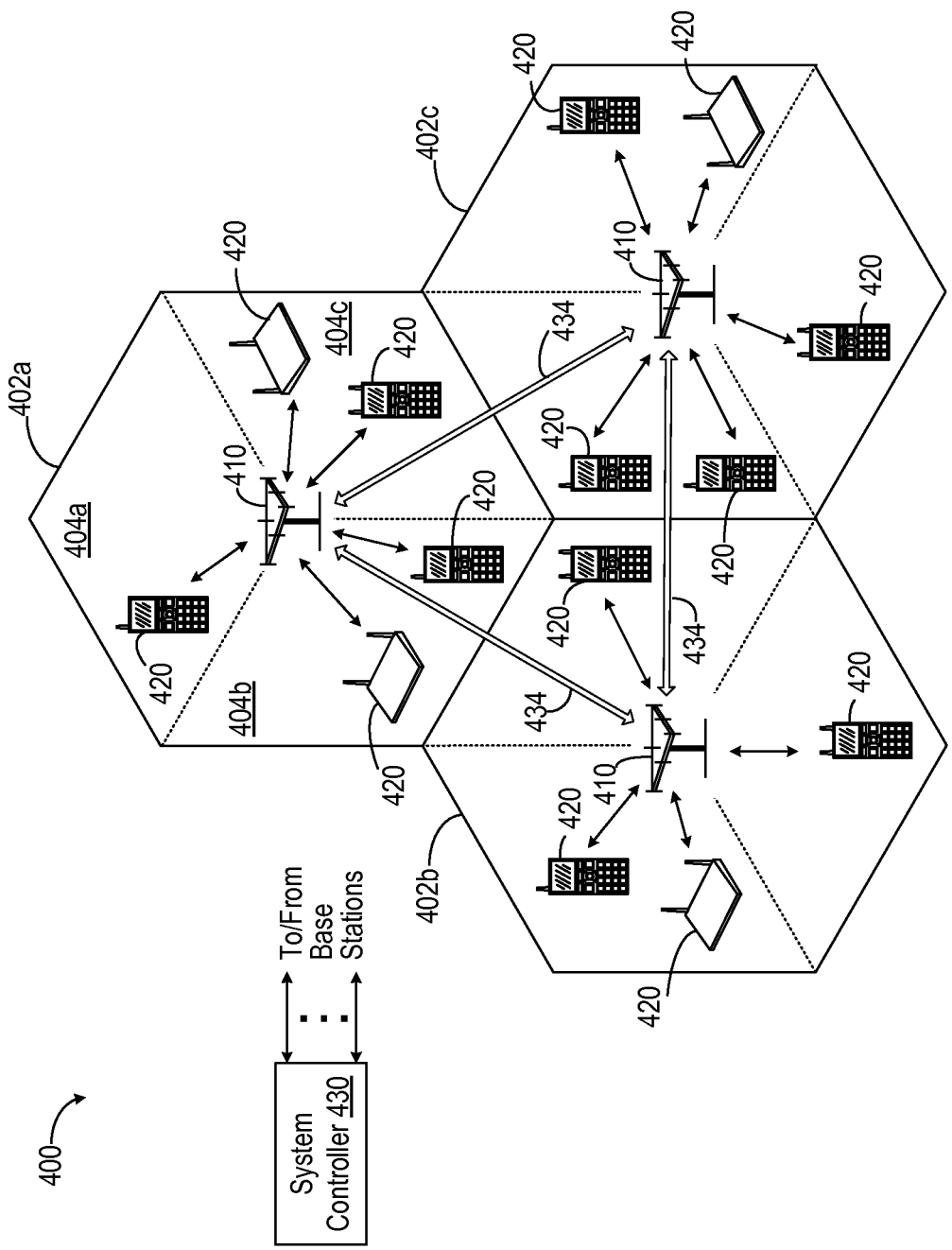
FIG. 4 depicts a block diagram of a communication system of user equipment (UE) communicating with respective base stations and subject to interference from the other respective base station.

FIG. 4 is an illustration of a wireless multiple-access communication system 400 in accordance with various aspects. In one example, the wireless multiple-access communication system 400 includes multiple base stations 410 and multiple terminals 420. Further, one or more base stations 410 can communicate with one or more terminals 420. By way of non-limiting example, a base station 410 can be an access point, a Node B, and/or another appropriate network entity. Each base station 410 provides communication coverage for a particular geographic area 402a-c. As used herein and generally in the art, the term "cell" can refer to a base station 410 and/or its coverage area 402a-c depending on the context in which the term is used.

To improve system capacity, the coverage area 402a, 402b, or 402c corresponding to a base station 410 can be partitioned into multiple smaller areas (e.g., areas 404a, 404b, and 404c). Each of the smaller areas 404a, 404b, and 404c can be served by a respective base transceiver subsystem (BTS, not shown). As used herein and generally in the art, the term "sector" can refer to a BTS and/or its coverage area depending on the context in which the term is used. In one example, sectors 404a, 404b, 404c in a cell 402a, 402b, 402c can be formed by groups of antennas (not shown) at base station 410, where each group of antennas is responsible for communication with terminals 420 in a portion of the cell 402a, 402b, or 402c. For example, a base station 410 serving cell 402a can have a first antenna group corresponding to sector 404a, a second antenna group corresponding to sector 404b, and a third antenna group corresponding to sector 404c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

In accordance with one aspect, terminals 420 can be dispersed throughout the system 400. Each terminal 420 can be stationary or mobile. By way of non-limiting example, a terminal 420 can be an access terminal (AT), a mobile station, user equipment, a subscriber station, and/or another appropriate network entity. A terminal 420 can be a wireless device, a cellular phone, a personal digital assistant (PDA), a wireless modem, a handheld device, or another appropriate device. Further, a terminal 420 can communicate with any number of base stations 410 or no base stations 410 at any given moment.

In another example, the system 400 can utilize a centralized architecture by employing a system controller 430 that can be coupled to one or more base stations 410 and provide coordination and control for the base stations 410. In accordance with alternative aspects, system controller 430 can be a single network entity or a collection of network entities. Additionally, the system 400 can utilize a distributed architecture to allow the base stations 410 to communicate with each other as needed. Backhaul network communication 434 can facilitate point-to-point communication between base stations employing such a distributed architecture. In one example, system controller 430 can additionally contain one or more connections to multiple networks. These networks can include the Internet, other packet based networks, and/or circuit switched voice networks that can provide information to and/or from terminals 420 in communication with one or more base stations 410 in system 400. In another example, system controller 430 can include or be coupled with a scheduler (not shown) that can schedule transmissions to and/or from terminals 420. Alternatively, the scheduler can reside in each individual cell 402, each sector 404, or a combination thereof.

In an example, system 400 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 420 are orthogonalized by transmitting in different time intervals. FDMA utilizes frequency division multiplexing (FDM), wherein transmissions for different terminals 420 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 400 can also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, base stations 410 and terminals 420 in system 400 can communicate data using one or more data channels and signaling using one or more control channels. Data channels utilized by system 400 can be assigned to active terminals 420 such that each data channel is used by only one terminal at any given time. Alternatively, data channels can be assigned to multiple terminals 420, which can be superimposed or orthogonally scheduled on a data channel. To conserve system resources, control channels utilized by system 400 can also be shared among multiple terminals 420 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

Figure 5:
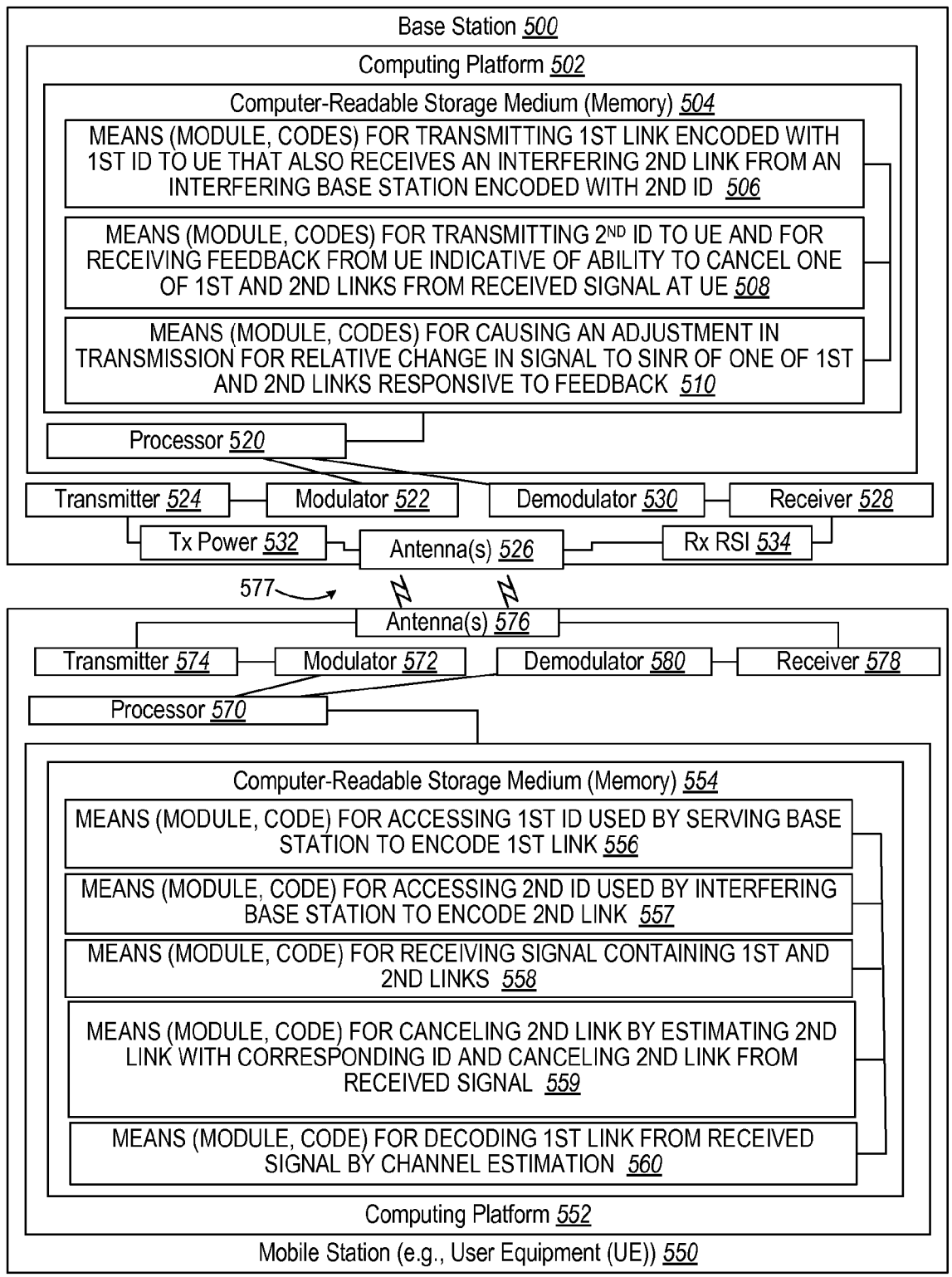
FIG. 5 depicts a block diagram of a base station and served user equipment (UE) each having a computing platform for performing methods for performing wireless interference cancellation.

In FIG. 5, a serving radio access network (RAN), depicted as an evolved base node (eNB) 500, has a computing platform 502 that provides means such as sets of codes for causing a computer to facilitate wireless inter-cell interference cancellation as either the serving base station or interfering base station. In particular, the computing platform 502 includes a computer readable storage medium (e.g., memory) 504 that stores a plurality of modules 506-510 executed by a processor(s) 520. A modulator 522 controlled by the processor 520 prepares a downlink signal for modulation by a transmitter 524, radiated by antenna(s) 526. A receiver 528 receives uplink signals from the antenna(s) 526 that are demodulated by a demodulator 530 and provided to the processor 520 for decoding. In particular, means (e.g., module, set of codes) 506 are provided for transmitting a first link encoded with a first identifier to a served UE that also receives an interfering second link from an interfering base station encoded with a second identifier. Means (e.g., module, set of codes) 508 are provided for transmitting the second identifier to the UE and for receiving feedback from the UE indicative of ability to cancel one of the first and second links from a received signal at the UE. Means (e.g., module, set of codes) 510 are provided for causing an adjustment in transmission for a relative change in signal to interfering noise ratio (SINR) of one of the first and second links responsive to the feedback. Thereby, the UE is enhanced in performing cancellation of the second link when received at a higher SINR by decoding the second link with the second identifier, re-encoding the second link with the second identifier, canceling the second link from the received signal, and decoding the first link from the received signal by channel estimation. Advantageously a transmit (Tx) power component 532 can adjust transmission power. A received signal indicator (RSI) 534 can measure signal strength.

With continued reference to FIG. 5, the mobile station or user equipment (UE) 550 has a computing platform 552 that provides means such as sets of codes for causing a computer to perform wireless inter-cell interference cancellation. In particular, the computing platform 552 includes a computer readable storage medium (e.g., memory) 554 that stores a plurality of modules 556-560 executed by a processor(s) 570. A modulator 572 controlled by the processor 570 prepares an uplink signal for modulation by a transmitter 574, radiated by antenna(s) 576 as depicted at 577 to the eNB 500. A receiver 576 receives downlink signals from the eNB 500 from the antenna(s) 576 that are demodulated by a demodulator 560 and provided to the processor 570 for decoding. In particular, means (e.g., module, set of codes) 556 are for accessing a first identifier used by the serving base station to encode a first link. Means (e.g., module, set of codes) 557 are for accessing a second identifier used by the interfering base station to encode a second link. Means (e.g., module, set of codes) 558 are for receiving a signal containing the first and second links. Means (e.g., module, set of codes) 559 are for canceling the second link by estimating the second link with the corresponding identifier and canceling the second link from the received signal. Means (e.g., module, set of codes) 560 are for decoding the first link from the received signal by channel estimation.

Figure 6:
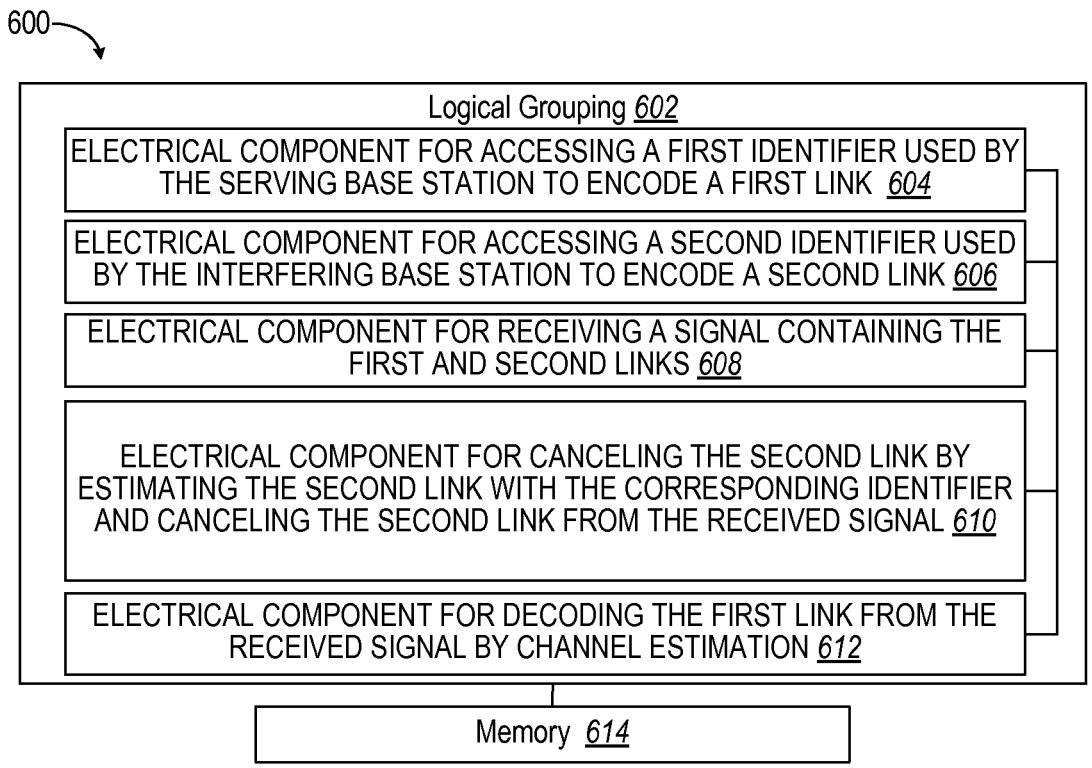
FIG. 6 depicts a block diagram of a system having a logical grouping of electrical components for performing wireless interference cancellation.

With reference to FIG. 6, illustrated is a system 600 that performs wireless inter-cell interference cancellation. For example, system 600 can reside at least partially within user equipment (UE). It is to be appreciated that system 600 is represented as including functional blocks, which can be functional blocks that represent functions implemented by a computing platform, processor, software, or combination thereof (e.g., firmware). System 600 includes a logical grouping 602 of electrical components that can act in conjunction. For instance, logical grouping 602 can include an electrical component for accessing a first identifier used by the serving base station to encode a first link 604. Moreover, logical grouping 602 can include an electrical component for accessing a second identifier used by the interfering base station to encode a second link 606. Further, logical grouping 602 can include an electrical component for receiving a signal containing the first and second links 608. Logical grouping 602 can include an electrical component for canceling the second link by estimating the second link with the corresponding identifier and canceling the second link from the received signal 610. Logical grouping 602 can include an electrical component for decoding the first link from the received signal by channel estimation 612. Additionally, system 600 can include a memory 614 that retains instructions for executing functions associated with electrical components 604-612. While shown as being external to memory 614, it is to be understood that one or more of electrical components 604-612 can exist within memory 614.

Figure 7:
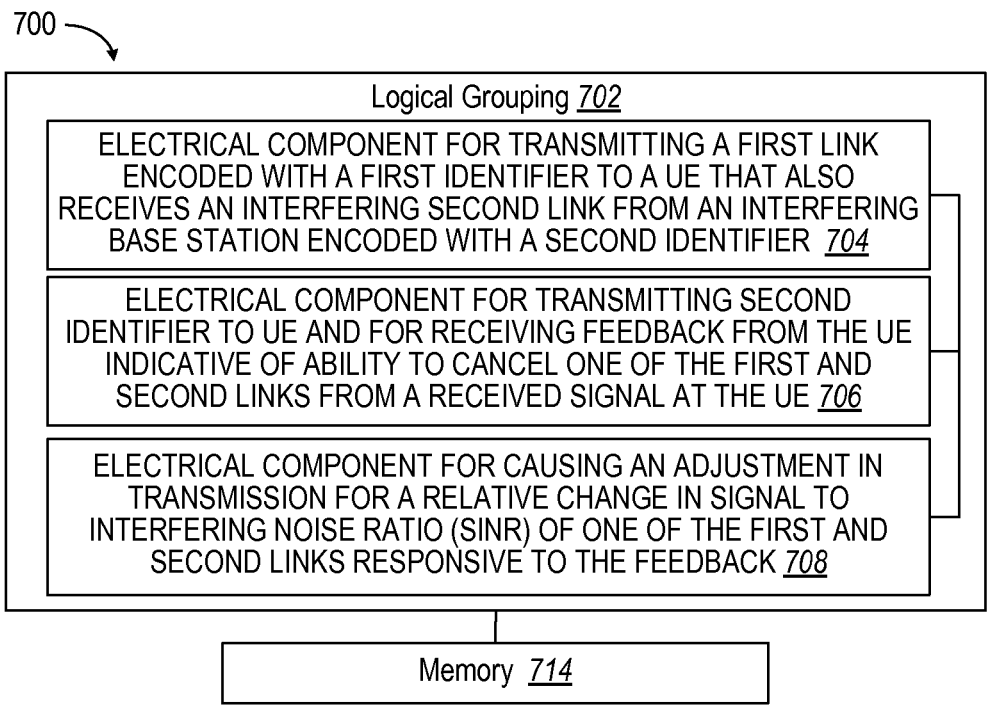
FIG. 7 depicts a block diagram of a system having a logical grouping of electrical components for enhancing performance of wireless interference cancellation.

With reference to FIG. 7, illustrated is a system 700 that enhances wireless inter-cell interference cancellation. For example, system 700 can reside at least partially within a base station. It is to be appreciated that system 700 is represented as including functional blocks, which can be functional blocks that represent functions implemented by a computing platform, processor, software, or combination thereof (e.g., firmware). System 700 includes a logical grouping 702 of electrical components that can act in conjunction. For instance, logical grouping 702 can include an electrical component for transmitting a first link encoded with a first identifier to a UE that also receives an interfering second link from an interfering base station encoded with a second identifier 704. Moreover, logical grouping 702 can include an electrical component for transmitting the second identifier to the UE and for receiving feedback from the UE indicative of ability to cancel one of the first and second links from a received signal at the UE 706. Further, logical grouping 702 can include an electrical component for causing an adjustment in transmission for a relative change in signal to interfering noise ratio (SINR) of one of the first and second links responsive to the feedback, wherein the UE performs cancellation of the second link when received at a higher SINR by decoding the second link with the second identifier, re-encoding the second link with the second identifier, canceling the second link from the received signal, and decoding the first link from the received signal by channel estimation 708. Additionally, system 700 can include a memory 714 that retains instructions for executing functions associated with electrical components 704-708. While shown as being external to memory 714, it is to be understood that one or more of electrical components 704-708 can exist within memory 714.

In FIG. 8, an apparatus 802 is provided for wireless inter-cell interference cancellation. A means 804 is provided for accessing a first identifier used by the serving base station to encode a first link. A means 806 is provided for accessing a second identifier used by the interfering base station to encode a second link. A means 808 is provided for receiving a signal containing the first and second links. A means 810 is provided for canceling the second link by estimating the second link with the corresponding identifier, and canceling the second link from the received signal. A means 812 is provided for decoding the first link from the received signal by channel estimation.

In FIG. 9, an apparatus 902 is provided for network facilitated wireless inter-cell interference cancellation. A means 904 is provided for transmitting a first link encoded with a first identifier to a node that also receives an interfering second link from an interfering base station encoded with a second identifier. A means 906 is provided for receiving feedback from the node indicative of ability to cancel one of the first and second links from a received signal at the node. A means 908 is provided for causing an adjustment in transmission for a relative change in signal to interfering noise ratio (SINR) of one of the first and second links responsive to the feedback, wherein the node performs cancellation of the second link when received at a higher SINR by decoding the second link with the second identifier, re-encoding the second link with the second identifier, canceling the second link from the received signal, and decoding the first link from the received signal by channel estimation.

Figure 10:
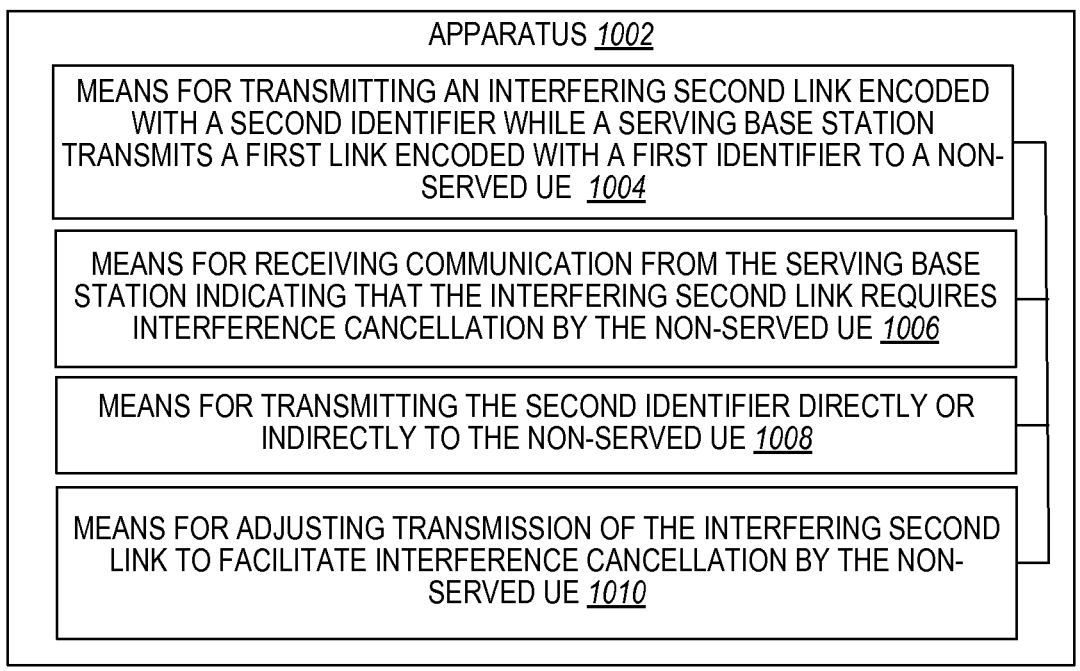
FIG. 10 depicts a block diagram of an apparatus having means for network facilitation of inter-cell interference cancellation at a non-served UE.

In FIG. 10, an apparatus 1002 is provided for facilitating wireless inter-cell interference cancellation by a non-served UE. Means 1004 are provided for transmitting an interfering second link encoded with a second identifier while a serving base station transmits a first link encoded with a first identifier to a non-served node. Means 1006 are provided for receiving communication from the serving base station indicating that the interfering second link requires interference cancellation by the non-served node. Means 1008 are provided for transmitting the second identifier directly or indirectly to the non-served UE. Means 1010 are provided for adjusting transmission of the interfering second link to facilitate interference cancellation by the non-served node.

While the specification describes particular examples of the present invention, those of ordinary skill can devise variations of the present invention without departing from the inventive concept. For example, the teachings herein refer to circuit-switched network elements but are equally applicable to packet-switched domain network elements.

Figure 11:
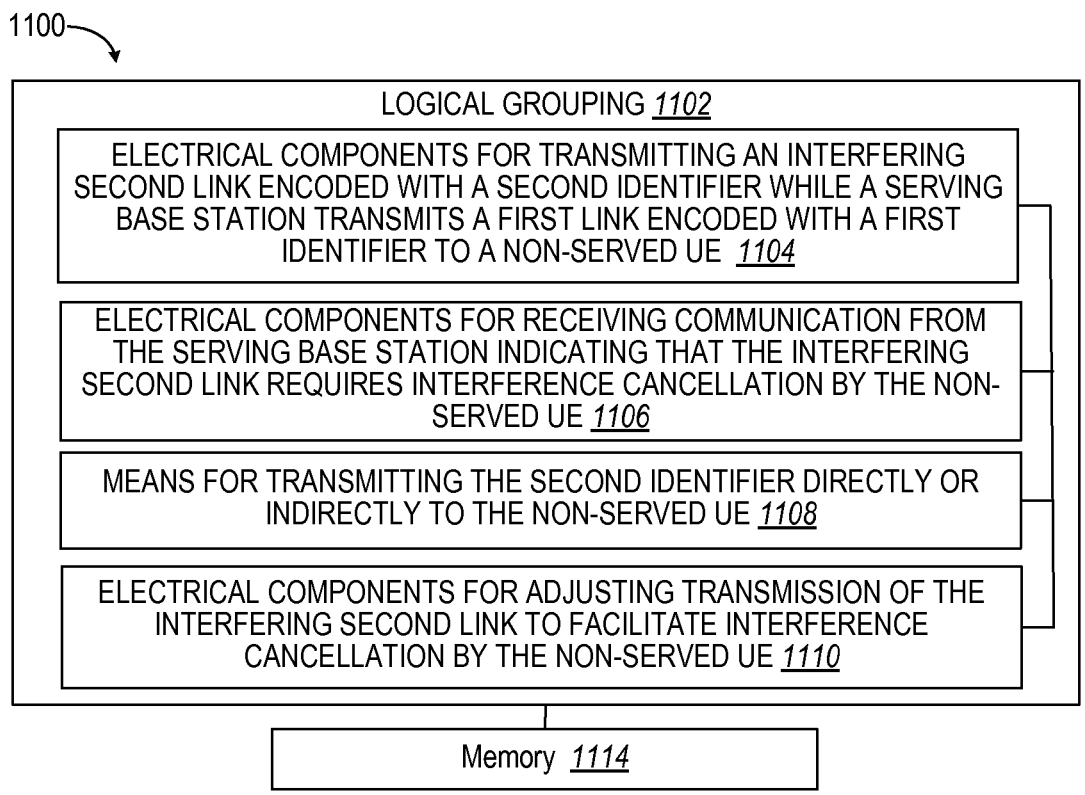
FIG. 11 depicts a block diagram of a system having a logical grouping of electrical components for enhancing performance of wireless interference cancellation at a non-served UE.

With reference to FIG. 11, illustrated is a system 1100 that enhances wireless inter-cell interference cancellation. For example, system 1100 can reside at least partially within a base station. It is to be appreciated that system 1100 is represented as including functional blocks, which can be functional blocks that represent functions implemented by a computing platform, processor, software, or combination thereof (e.g., firmware). System 1100 includes a logical grouping 1102 of electrical components that can act in conjunction. For instance, logical grouping 1102 can include an electrical component for transmitting an interfering second link encoded with a second identifier while a serving base station transmits a first link encoded with a first identifier to a non-served UE 1104. Moreover, logical grouping 1102 can include an electrical component for receiving communication from the serving base station indicating that the interfering second link requires interference cancellation by the non-served UE 1106. In addition, logical grouping 1102 can include an electrical component for transmitting the second identifier directly or indirectly to the non-served UE 1108. Further, logical grouping 1102 can include an electrical component for adjusting transmission of the interfering second link to facilitate interference cancellation by the non-served UE 1110. Additionally, system 1100 can include a memory 1114 that retains instructions for executing functions associated with electrical components 1104-1110. While shown as being external to memory 1114, it is to be understood that one or more of electrical components 1104-1110 can exist within memory 1114.

By virtue of the foregoing, it should be appreciated that in one aspect, a UE that is receiving interference can benefit from receiving the identifier that encoded the interference. Receipt of the identifier, such as a MAC ID or c-RNTI can advantageously be tunneled from an interfering base station to the serving base station to the UE. This transmission can be prompted by a request initiated by the UE or serving base station.

In another aspect, Pilot Interference Cancellation for OFDMA systems can be supported. For example, the UE can cancel the reference signal or can use a different interference estimate for resource elements containing the cancelled Reference Signal (RS).

In an additional aspect, Control Interference Cancellation can be supported. For example, the UE can decode the PDCCH of interfering sector, which can be based on received c-RNTI. Further, the UE can cancel the PDCCH after decoding it.

In another additional aspect, Inter-Cell Interference Coordination (ICIC) can be performed based on decoded PDCCH assignment.

In a further aspect, Traffic Interference Cancellation can be supported in situations such as (1) restricted association, (2) range expansion (lower geometry cell, and (3) disjoint links. For example, the UE performs ICIC in each situation. As another example, the serving base station can determine post-cancellation SINR, either director or by receiving information from the UE, and that the UE could handover to the interfering base station.

In yet another aspect, CQI based on post-cancellation SINR can be supported. UE feeds back CQI based on post-cancellation SINR. In some instances, the UE also feeds pre-cancellation CQI. The serving eNB schedules can be based on post-cancellation ICIC. In another instance, pre-cancellation CQI is provided when HARQ fails.

In yet an additional aspect, feedback of control channels is supported. The UE feeds back CQI/ACK corresponding to interfering sectors. The serving base station tunnels the CQI/ACK to the interfering base station. The interfering base station receives the CQI/ACK feedback either directly or over a backhaul connection. In one example, the CQI/ACK can pertain to data. In another example, the CQI/ACK can pertain to PDCCH. In an additional example, the CQI/ACK can pertain to Reference Signal (RS). The serving base station can change (e.g., reduce) its power to aid its UE in ICIC (e.g., based on feedback). The interfering base station can change (e.g., increase) its power to aid a non-served neighbor UE (e.g., based on feedback).

In yet another additional aspect, an interfering base station can control the rate to enable ICIC. In one instance, this rate control can pertain to PDCCH. In another aspect, the rate control can pertain to PDSCH. The UE can provide feedback and then perform ICIC. The interfering base station provides a rate which enables a non-served UE to decode. (e.g., based on feedback).

For example, the exemplary aspects discussed above can be implemented with nodes that can reciprocate in playing the role of a transmitting node in one instance and then playing the role of an interfering node in another. Further, fairness can be meted out in relation to receptivity of a node to favorably respond to a reduced transmit power request. Alternatively, a node can only be provisioned to act as a selected one of a transmitting node and an interfering node.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for network facilitating wireless inter-cell interference cancellation at a served user equipment (UE), comprising:
   transmitting a first link encoded with a first identifier to the served UE that also receives an interfering second link from an interfering base station encoded with a second identifier; and
   transmitting the second identifier used to encode the interfering second link to the served UE.

2. The method of claim 1, further comprising adjusting a transmission rate for pilots to enhance an ability of the served UE to cancel pilot interference.

3. The method of claim 1, further comprising relaying pilot feedback from the served UE to the interfering base station to cause a change in transmission power in a pilot interference.

4. The method of claim 3, further comprising transmitting dedicated pilots in the first and second links.

5. The method of claim 1, further comprising enhancing canceling control channel interference of the second link.

6. The method of claim 5, further comprising transmitting a unicast control channel scrambled with a medium access control (MAC) identifier.

7. The method of claim 6, wherein the unicast control channel is transmitted using physical layer resources is occupied by the interfering base station.

8. The method of claim 6, further comprising transmitting a physical downlink control channel (PDCCH) at a lower transmission rate encoded for increased signal to interfering noise ratio than a PDDCH from the interfering base station.

9. The method of claim 6, further comprising adjusting transmission power for a physical downlink control channel (PDCCH) responsive to feedback from the served UE regarding interference by the interfering base station.

10. The method of claim 6, further comprising communicating with the interfering base station to cause a transmission power adjustment for an interfering downlink control channel (PDCCH) responsive to feedback from the served UE regarding interference by the interfering base station.

11. The method of claim 1, further comprising enhancing cancellation of traffic channel interference of the second link.

12. The method of claim 11, wherein the traffic interference cancellation is performed in a selected one of a group consisting of restricted association by the interfering base station, range expansion of a lower geometry cell, and disjoint links.

13. The method of claim 11, further comprising transmitting a unicast control channel scrambled with a medium access control (MAC) identifier.

14. The method of claim 11, further comprising:
receiving channel quality for the first link and reporting channel quality and downlink acknowledgement assignment decoded for the second link; and
transmitting a traffic channel on the first link at a transmission rate adjusted for increase signal to interfering noise ratio enabling decoding without prior cancellation of the traffic channel interference.

15. The method of claim 11, further comprising:
receiving channel quality for the first link to a serving base station and channel quality and downlink acknowledgement assignment decoded for the second link;
communicating with the interfering base station to cause adjustment of at least one of the traffic channel on the first link and the traffic channel interference on the second link at an adjusted transmission rate,
wherein the served UE decodes first a link having the higher signal to interfering noise ratio subsequent to the transmission rate adjustment.

16. The method of claim 1, further comprising receiving a request for the second identifier from the served UE.

17. The method of claim 1, further comprising receiving the second identifier from the interfering base station via a backhaul connection.

18. The method of claim 1, further comprising receiving the second identifier comprising a medium access control (MAC) identifier.

19. The method of claim 1, further comprising receiving the second identifier comprising a Cell Radio Network Temporary Identifier (c-RNTI).

20. The method of claim 1, further comprising:
determining post-cancellation signal to interfering noise ratio (SINR); and
determining that the served UE can handover to the interfering base station.

21. The method of claim 1, further comprising:
receiving channel quality indicator (CQI) from the served UE based on post cancellation SINR;
scheduling the served UE based upon the post cancellation SINR.

22. The method of claim 21, further comprising receiving pre-cancellation CQI in response to Hybrid Automatic Repeat Request (HARQ) failure.

23. The method of claim 1, further comprising:
receiving channel quality indicator (CQI) and acknowledgement (ACK) from the served UE corresponding to an interfering sector; and
transmitting the CQI and ACK to the interfering base station.

24. The method of claim 1, further comprising controlling a power level for a selected one of a group consisting of a data channel, a Reference Signal (RS) channel, and a physical downlink control channel (PDCCH).

25. A computer program product for network facilitating wireless inter-cell interference cancellation at a served user equipment (UE), comprising:
a non-transitory computer-readable storage medium comprising,
a first set of codes for causing a computer to transmit a first link encoded with a first identifier to the served UE that also receives an interfering second link from an interfering base station encoded with a second identifier; and
a second set of codes for causing the computer to transmit the second identifier used to encode the interfering second link to the served UE.

26. An apparatus for network facilitating wireless inter-cell interference cancellation at a served user equipment (UE), comprising:
means for transmitting a first link encoded with a first identifier to the served UE that also receives an interfering second link from an interfering base station encoded with a second identifier; and
means for transmitting the second identifier used to encode the interfering second link to the served UE.

27. An apparatus for network facilitating wireless inter-cell interference cancellation at a served user equipment (UE), comprising:
a transmitter for transmitting a first link encoded with a first identifier to the served UE that also receives an interfering second link from an interfering base station encoded with a second identifier; and transmitting the second identifier used to encode the interfering second link to the served UE.

28. The apparatus of claim 27, further comprising a computing platform for adjusting a transmission rate for pilots to enhance an ability of the served UE to cancel pilot interference.

29. The apparatus of claim 27, further comprising a computing platform for relaying pilot feedback from the served UE to the interfering base station to cause a change in transmission power in a pilot interference.

30. The apparatus of claim 29, wherein the transmitter is further for transmitting dedicated pilots in the first and second links.

31. The apparatus of claim 27, further comprising a computing platform for enhancing canceling control channel interference of the second link.

32. The apparatus of claim 31, wherein the transmitter is further for transmitting a unicast control channel scrambled with a medium access control (MAC) identifier.

33. The apparatus of claim 32, wherein the transmitter is further for transmitting a control channel using physical layer resources occupied by the interfering base station.

34. The apparatus of claim 31, wherein the transmitter is further for transmitting a physical downlink control channel (PDCCH) at a lower transmission rate encoded for increased signal to interfering noise ratio than a PDDCH from the interfering base station.

35. The apparatus of claim 31, wherein the transmitter is further for adjusting transmission power for a physical downlink control channel (PDCCH) responsive to feedback from the served UE regarding interference by the interfering base station.

36. The apparatus of claim 31, wherein the computing platform is further for communicating with the interfering base station to cause a transmission power adjustment for an interfering downlink control channel (PDCCH) responsive to feedback from the served UE regarding interference by the interfering base station.

37. The apparatus of claim 27, wherein the computing platform is further for enhancing cancellation of traffic channel interference of the second link.

38. The apparatus of claim 37, wherein the transmitter is further for transmitting a unicast control channel scrambled with a medium access control (MAC) identifier.

39. The apparatus of claim 37, wherein
the receiver is further for receiving channel quality for the first link and reporting channel quality and downlink acknowledgement assignment decoded for the second link; and
the transmitter is further for transmitting a traffic channel on the first link at a transmission rate adjusted for increase signal to interfering noise ratio enabling decoding without prior cancellation of the traffic channel interference.

40. The apparatus of claim 37, wherein
the receiver is further for receiving channel quality for the first link to a serving base station and channel quality and downlink acknowledgement assignment decoded for the second link;
the computing platform is further for communicating with the interfering base station to cause adjustment of at least one of the traffic channel on the first link and the traffic channel interference on the second link at an adjusted transmission rate,
wherein the served UE decodes first a link having the higher signal to interfering noise ratio subsequent to the transmission rate adjustment.

41. The method of claim 1, further comprising:
receiving feedback from the served UE indicative of ability to cancel one of the first and second links from a received signal at the served UE; and
causing an adjustment in transmission for a relative change in signal to interfering noise ratio (SINR) of one of the first and second links responsive to the feedback,
wherein the served UE performs cancellation of the second link when received at a higher SINR by decoding the second link with the second identifier, re-encoding the second link with the second identifier, canceling the second link from the received signal, and decoding the first link from the received signal by channel estimation.

42. The computer program product of claim 25, further comprising:
a third set of codes for causing the computer to receive feedback from the served UE indicative of ability to cancel one of the first and second links from a received signal at the served UE; and
a fourth set of codes for causing the computer to cause an adjustment in transmission for a relative change in signal to interfering noise ratio (SINR) of one of the first and second links responsive to the feedback,
wherein the served UE performs cancellation of the second link when received at a higher SINR by decoding the second link with the second identifier, re-encoding the second link with the second identifier, canceling the second link from the received signal, and decoding the first link from the received signal by channel estimation.

43. The apparatus of claim 26, further comprising:
means for receiving feedback from the served UE indicative of ability to cancel one of the first and second links from a received signal at the served UE; and
means for causing an adjustment in transmission for a relative change in signal to interfering noise ratio (SINR) of one of the first and second links responsive to the feedback,
wherein the served node performs cancellation of the second link when received at a higher SINR by decoding the second link with the second identifier, re-encoding the second link with the second identifier, canceling the second link from the received signal, and decoding the first link from the received signal by channel estimation.

44. The apparatus of claim 27, further comprising:
a receiver for receiving feedback from the served UE indicative of ability to cancel one of the first and second links from a received signal at the served UE; and
a computing platform for causing an adjustment in transmission for a relative change in signal to interfering noise ratio (SINR) of one of the first and second links responsive to the feedback,
wherein the served UE performs cancellation of the second link when received at a higher SINR by decoding the second link with the second identifier, re-encoding the second link with the second identifier, canceling the second link from the received signal, and decoding the first link from the received signal by channel estimation.

\* \* \* \* \*